(12) United States Patent
Yunoki et al.

(10) Patent No.: US 11,359,552 B2
(45) Date of Patent: Jun. 14, 2022

(54) CONTROL DEVICE, GAS TURBINE, CONTROL METHOD, AND PROGRAM

(71) Applicant: MITSUBISHI HEAVY INDUSTRIES, LTD., Tokyo (JP)

(72) Inventors: Keita Yunoki, Tokyo (JP); Kei Inoue, Tokyo (JP); Takashi Hiyama, Tokyo (JP); Eisaku Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 143 days.

(21) Appl. No.: 16/787,699

(22) Filed: Feb. 11, 2020

(65) Prior Publication Data
US 2020/0392908 A1 Dec. 17, 2020

(30) Foreign Application Priority Data

Jun. 12, 2019 (JP) .............................. JP2019-109353

(51) Int. Cl.
*F02C 9/28* (2006.01)
*F23N 5/00* (2006.01)
*F02C 7/228* (2006.01)
*F02C 9/54* (2006.01)

(52) U.S. Cl.
CPC ................ *F02C 9/28* (2013.01); *F23N 5/003* (2013.01); *F02C 7/228* (2013.01); *F02C 9/54* (2013.01); *F05D 2270/083* (2013.01); *F05D 2270/303* (2013.01); *F23N 2241/20* (2020.01)

(58) Field of Classification Search
CPC .. F02C 7/228; F02C 9/28; F23N 5/003; F23N 2223/40; F23N 2223/48; F23N 2241/20
See application file for complete search history.

(56) References Cited

U.S. PATENT DOCUMENTS

| | | | |
|---|---|---|---|
| 2010/0043387 A1 | 2/2010 | Myers et al. | |
| 2012/0017601 A1* | 1/2012 | Eroglu | F02C 6/003 60/776 |
| 2015/0040573 A1* | 2/2015 | Ferreira-Providakis | F02C 9/20 60/772 |
| 2016/0018111 A1* | 1/2016 | Therkorn | F02C 6/003 60/773 |
| 2016/0333731 A1* | 11/2016 | Zhang | F02C 9/28 |

FOREIGN PATENT DOCUMENTS

| | | |
|---|---|---|
| EP | 2 857 658 | 4/2015 |
| EP | 3 244 040 | 11/2017 |
| JP | 2009-115081 | 5/2009 |

* cited by examiner

*Primary Examiner* — Scott J Walthour
(74) *Attorney, Agent, or Firm* — Wenderoth, Lind & Ponack, L.L.P.

(57) ABSTRACT

A control device is a control device for a gas turbine including a plurality of combustors and is configured to select combustors to ignite in accordance with a target load on the basis of a predictor which defines a relationship between a load and the number and arrangement of combustors to ignite and a combustion temperature.

11 Claims, 7 Drawing Sheets

CONTROL DEVICE, GAS TURBINE, CONTROL METHOD, AND PROGRAM

BACKGROUND OF THE INVENTION

Field of the Invention

The present invention relates to a control device, a gas turbine, a control method, and a program.

Priority is claimed on Japanese Patent Application No. 2019-109353, filed Jun. 12, 2019, the content of which is incorporated herein by reference.

Description of Related Art

There is a growing movement to expand the use of renewable energy. However, since the output of renewable energy fluctuates greatly, the stable supply of electric power therefrom is difficult. Under such circumstances, thermal power generation is required to have a role to complement renewable energy. In order to meet this demand, combustors for gas turbines capable of greatly varying a load are required.

Patent Document 1 describes control for operating only a number of combustors according to an output and an operation state of a gas turbine among a plurality of combustors.

Patent Document

Patent Document 1: Japanese Unexamined Patent Application. First Publication No. 2009-115081

SUMMARY OF THE INVENTION

Although a combustor for a gas turbine can operate without discharging an unburned fuel (including intermediate products due to a combustion reaction) during a high-load operation, when the combustor operates at a low load, if an attempt is made to cope with load fluctuations by increasing or decreasing a combustion temperature of a plurality of combustors, a quenching reaction is performed in accordance with a decrease in combustion temperature or interference with cooling air and a large amount of unburned fuel is discharged.

Therefore, an object of the present invention is to provide a control device, a gas turbine, a control method, and a program capable of solving the above-described problems.

According to an aspect of the present invention, a control device is a control device for a gas turbine including a plurality of combustors including: a prediction unit which is configured to determine the number and arrangement of combustors required for achieving a target load on the basis of a learned model in which a relationship between a load and the number and arrangement of combustors to ignite is defined; and a control unit which is configured to select and ignite combustors of the combustors determined by the prediction unit.

Also, according to an aspect of the present invention, the learned model is configured to determine a relationship between the load and the number of combustors to ignite, the arrangement of the combustors, and a combustion temperature of the combustors at which an amount of unburned fuel to be discharged is equal to or less than a predetermined threshold value, the prediction unit is configured to determine the number of combustors, the arrangement of the combustors, and the combustion temperature of the combustors according to the target load on the basis of the learned model, and the control unit is configured to control a combustion temperature of the selected combustors on the basis of the combustion temperature determined by the prediction unit.

According to an aspect of the present invention, the control unit is configured to perform control so that combustors other than the selected combustors fully extinguish.

According to an aspect of the present invention, the control device further includes: a determination unit which is configured to determine whether an amount of unburned fuel to be discharged is equal to or less than a predetermined value for each of the selected combustors.

According to an aspect of the present invention, in the control device, the determination unit is configured to determine the presence or absence of resonance of the turbine for each of the selected combustors.

According to an aspect of the present invention, the prediction unit is configured to minimize the amount of unburned fuel to be discharged to be equal to or less than a predetermined threshold value while the target load is achieved and determine a combination of the combustors in which resonance of the turbine does not occur.

According to an aspect of the present invention, the control device further includes: a frequency detection unit which is configured to detect an ignition frequency for each of the combustors, wherein the control unit is configured to select the combustors so that the bias of the ignition frequency detected by the frequency detection unit falls within a predetermined range.

According to an aspect of the present invention, when a first target load is applied, the control unit is configured to select and ignites a combination of combustors different from that at the last time when the first target load has been applied.

According to an aspect of the present invention, the learned model is composed of a plurality of prediction models and the plurality of prediction models includes a first prediction model in which a performance for each of the combustors is predicted and a second prediction model in which a combination of the combustors in which the target load is achieved on the basis of the performance for each of the combustors and a combustion temperature of each of the combustors is predicted.

According to an aspect of the present invention, a gas turbine includes: a compressor; a plurality of combustors; a turbine; and the control device according to any one of the above aspects.

According to an aspect of the present invention, a control method includes: determining the number and arrangement of combustors required for achieving a target load on the basis of a learned model in which a relationship between a load and the number and arrangement of combustors to ignite is defined, and selecting and igniting the combustors determined in the determining of the number and arrangement of the combustors on the basis of the target load.

According to an aspect of the present invention, a program causes a computer configured to control a gas turbine including a plurality of combustors to execute: determining the number and arrangement of combustors required for achieving a target load on the basis of a learned model in which a relationship between a load and the number and arrangement of combustors to ignite is defined; and selecting and igniting the combustors determined in the determining of the number and arrangement of the combustors on the basis of the target load.

According to the present invention, it is possible to cope with rapid and large-scale load fluctuations while an amount of unburned fuel to be discharged is minimized.

DETAILED DESCRIPTION OF THE INVENTION

Ignition control of combustors for a gas turbine according to each embodiment of the present invention will be described below with reference to FIGS. 1 to 7.

First Embodiment

Figure 1:
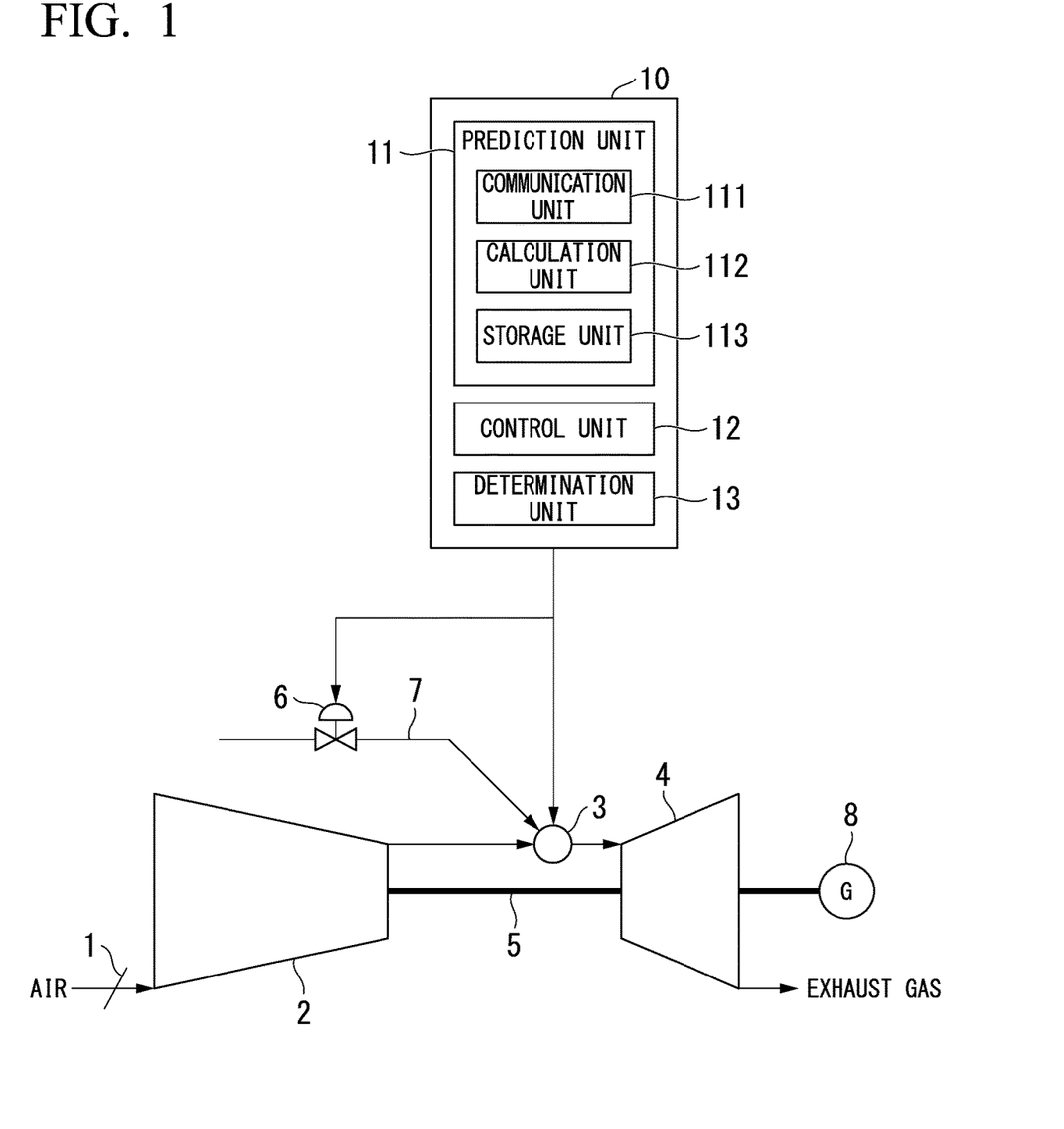
FIG. 1 is a schematic diagram of a gas turbine according to a first embodiment of the present invention.

FIG. 1 is a schematic diagram of a gas turbine according to a first embodiment of the present invention. As shown in FIG. 1, the gas turbine includes an inlet guide vane (IGV) 1 which adjusts an amount of air flowing into a compressor 2, the compressor 2 which compresses the air which has flowed in to generate compressed air, combustors 3 in which the air compressed by the compressor 2 is mixed with a fuel gas and which combusts the mixed gas to generate a high-temperature combustion gas, a turbine 4 which drives an electric power generator 8 by rotating a rotor 5 using a combustion gas, a fuel control valve 6 which adjusts a flow rate of a fuel gas supplied to the combustors 3, and a control device 10. The combustors 3 are multi-can (for example, 16-can) combustors and a fuel pipe 7 having the fuel control valves 6 provided therein individually is connected to each of the combustors 3.

The control device 10 controls the output of the gas turbine. The control device 10 includes a prediction unit 11, a control unit 12, and a determination unit 13.

The prediction unit 11 predicts a combination of the combustors 3 and operation conditions in which a target load can be safely achieved. To be specific, the prediction unit 11 predicts the number of ignition cans of each of the combustors 3 in which the discharge of an unburned fuel and resonance are minimized and a target load can be achieved, their arrangement (the arrangement of ignition cans), and a combustion temperature for each ignition can. Examples of the unburned fuel include methane, ethane, propane, butane, carbon monoxide, hydrogen, ammonia, light oil, heavy oil, and the like.

The control unit 12 controls the gas turbine. For example, the control unit 12 causes some or all of the multi-can combustors 3 to ignite in accordance with the prediction of the prediction unit 11. For example, the control unit 12 adjusts a degree of opening of the IGV 1 and a degree of opening of the fuel control valve 6.

The determination unit 13 confirms that, when combustors 3 selected through the prediction of the prediction unit 11 ignite, an amount of unburned fuel to be discharged is equal to or less than a predetermined threshold value and that no resonance occurs in the turbine 4.

Figure 2:
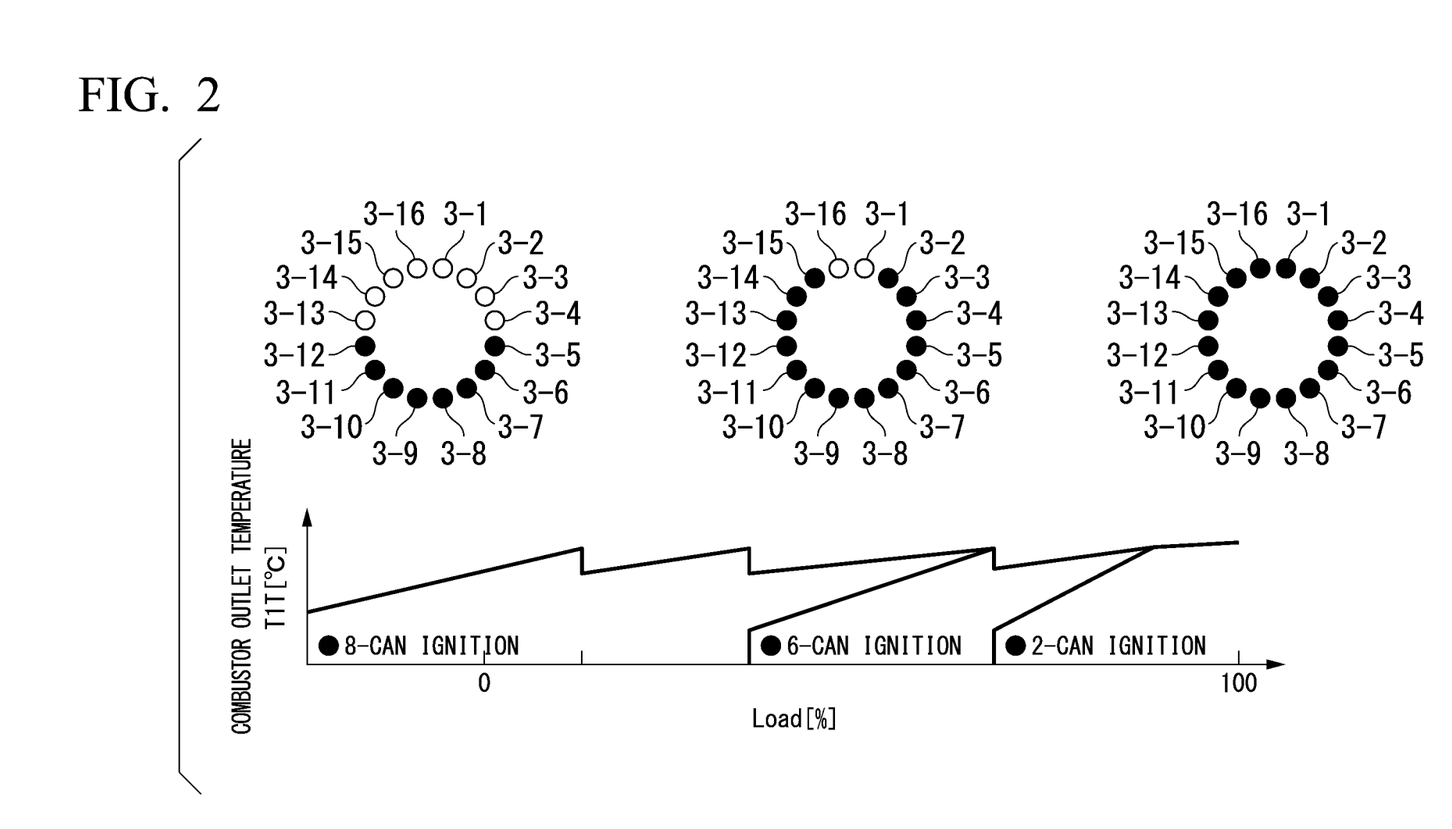
FIG. 2 is a diagram for explaining a method for controlling a combustor according to the first embodiment of the present invention.

Reference is now made to FIG. 2. FIG. 2 is a diagram for explaining a method for controlling a combustor according to the first embodiment of the present invention. A vertical axis of a graph in FIG. 2 indicates an outlet temperature of an ignited combustor 3 and a horizontal axis thereof indicates a load. Combustors 3-1 to 3-16 in FIG. 2 are 16-can combustors included in a gas turbine. Hereinafter, when it is not necessary to distinguish the combustors 3-1 to 3-16, the combustors 3-1 to 3-16 are simply referred to as a "combustor 3 or combustors 3." Black combustors 3 represent combustors to ignite and white combustors 3 represent combustors to extinguish. In the example of FIG. 2, when a target load is low, the control unit 12 causes 8 cans (combustors 3-5 to 3-12) among 16 cans to ignite. When a target load is medium 6 more cans are caused to ignite and the gas turbine operates using a total of 14 cans (combustors 3-2 to 3-15). If a load increases, all of the cans (16 cans) are caused to ignite so that the gas turbine operates. The combustors 3 to ignite are the combustors 3 determined by the prediction unit 11 as being necessary for achieving a target load.

The magnitude of the load and the number of cans have a positive correlation and the higher the target load, the greater the number of cans of the combustor 3 to ignite. The number of combustors 3 to ignite among the combustors 3-1 to 3-16 is determined, for example, by the prediction unit 11 on the basis of a learned model in which a relationship between the magnitude of the load and the number of cans has been learned from past results.

Also, in the example of FIG. 2, when a load is low, the combustors 3-5 to 3-12 ignite, but combustors 3 to ignite are determined by the prediction unit 11 (the arrangement of the combustors 3). For example, the prediction unit 1 may determine the combustors 3 to ignite on the basis of a learned model in which a relationship between the number of ignition cans and the arrangement of ignition cans in which resonance of the turbine 4 and combustion vibration do not easily occur has been learned from past results.

Also, the prediction unit 11 determines a combustion temperature for each of the combustors 3 to ignite. Here, a combustion temperature of the combustors 3 to ignite is a temperature high enough such that an unburned fuel is not discharged. This temperature is a combustion temperature when the gas turbine operates in a high load zone. A maximum value of a threshold value of a combustion temperature of the combustors 3 is set on the basis of an amount of NOx to be discharged, thermal stress, and the like associated with the performance of the combustors and a minimum value thereof is set on the basis of an amount of unburned fuel to be discharged, flame holding properties, and the like. For example, the prediction unit 11 determines a combustion temperature of the combustors 3 on the basis of a learning model in which a combustion temperature at which an amount of unburned fuel to be discharged falls within an allowable range has been learned.

The control unit 12 controls ignition and extinguishing of each of the 16-cans combustors 3 in accordance with a combination determined by the prediction unit 11. In this embodiment, a required number of combustors 3 ignite in accordance with a load and combustion is performed at the same high temperature as during a high load zone operation. On the other hand, unnecessary combustors 3 do not ignite in accordance with a target load and fully extinguish. Thus, it is possible to prevent generation and discharge of an unburned fuel.

Referring to FIG. 1 again, the prediction unit 1 will be described. The prediction unit 11 includes a communication unit 111, a calculation unit 112, and a storage unit 113.

The communication unit 111 receives monitoring data detected by various sensors provided in the gas turbine and transmits control information concerning the combustors. Furthermore, the communication unit 111 receives, for example, a target load command value from a higher-ordered control device.

The calculation unit 112 includes various physical models and learned models constructed using machine learning or the like. The calculation unit 112 receives a target load and various monitoring data from the communication unit 111 and calculates control information concerning the combustors such as the number of ignition cans of the combustors 3, the arrangement of ignition cans, and the combustion temperature of each of the combustors 3 according to the target load using the physical models and the learned models.

The storage unit 113 stores the various monitoring data received by the communication unit 111 and the control information concerning the combustors calculated by the calculation unit 112.

Figure 3:
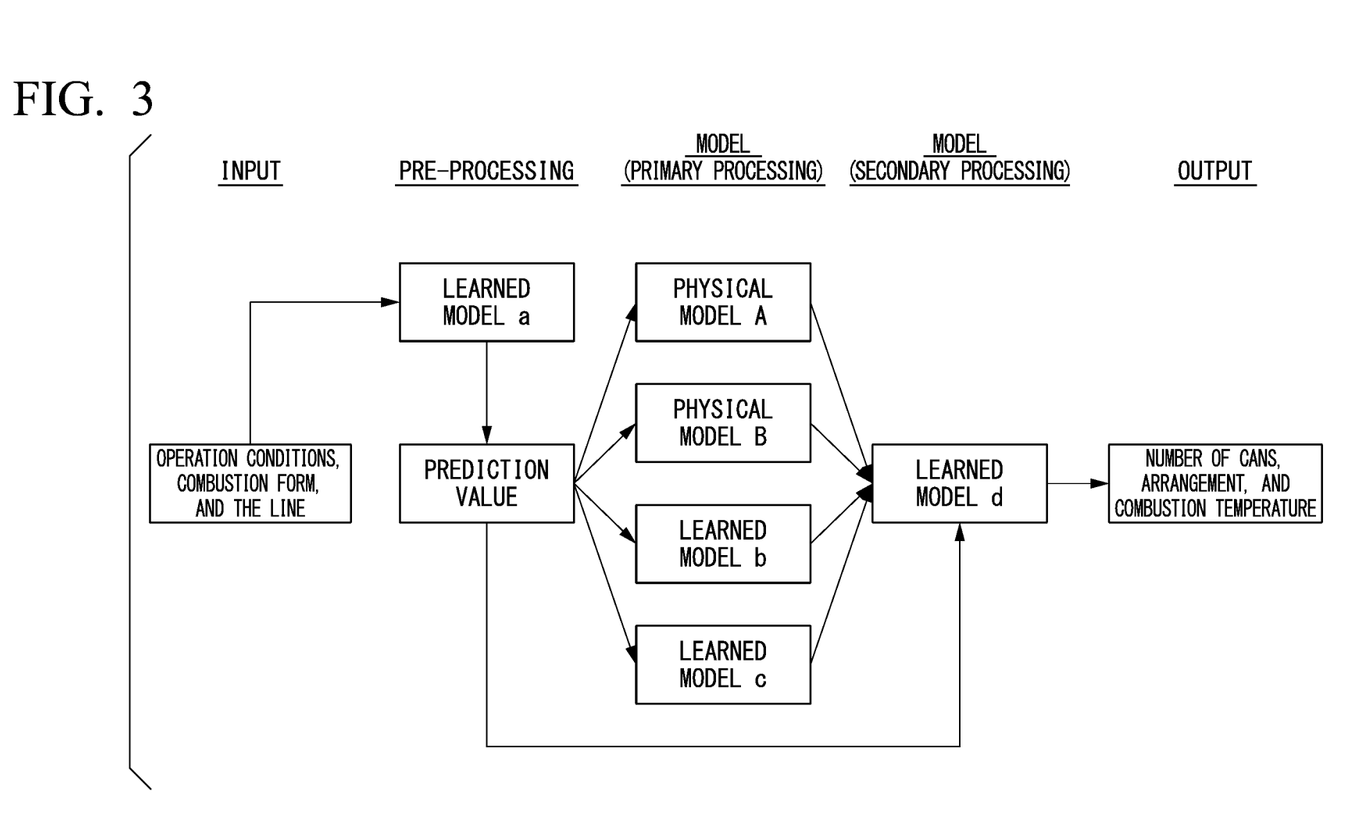
FIG. 3 is a diagram showing an example of a prediction unit in the first embodiment of the present invention.

An example of the prediction unit 11 (the calculation unit 112) will be described in more detail below with reference to FIG. 3. FIG. 3 is a diagram showing an example of the prediction unit in the first embodiment of the present invention. A processing procedure, the model contents, the number of models, and combinations are not limited to those shown in FIG. 3.

(1) Input

The calculation unit 112 obtains operation conditions (a target load), the combustion characteristics of the combustors 3 which have ignited after the starting-up of ignition (for example, an actual combustion temperature, a load, an amount of unburned fuel to be discharged, and the like), vibration information of the turbine 4, and the like from the communication unit 111.

(2) Pre-Processing

The calculation unit 112 includes a learned model a in which a relationship between a target load and a fuel flow rate and a combustion temperature capable of achieving the target load has been leaned using machine learning or reinforcement learning. In the pre-processing, the learned model a has a target load input therein and outputs of a fuel flow rate and a combustion temperature capable of achieving the input target load as prediction values.

(3) Primary Processing

The calculation unit 112 includes physical models A and B in which the fuel flow rate and the combustion temperature in the pre-processing are realized for each of the combustors 3-1 to 3-16 and learned models b and c constructed using machine learning. For example, the physical model A includes a calculation expression or the like in which a relationship between a combustion temperature and a load is represented for each of the combustors 3. For example, the physical model B includes a calculation expression or the like in which a relationship between a fuel flow rate and an air flow rate and a combustion temperature is represented for each of the combustors 3. For example, a learned model b is a model in which a relationship between a combustion temperature and an amount of unburned fuel to be discharged for each of the combustors 3 has been learned. For example, a learned model c is a model in which a relationship between the number of ignition cans and a load for the combustors 3 has been learned. The calculation unit 112 calculates performance prediction values of the combustors 3-1 to 3-16 using these physical models and learned models. The physical model A or the like and the learned model b or the like are prepared for each of the combustors 3-1 to 3-16.

(4) Secondary Processing and Output

The calculation unit 112 includes a learned model d in which a relationship among a load, a safe combination (in which no resonance occurs) of the combustors 3-1 to 3-16, and a combustion temperature has been learned. For example, the learned model d has calculation results in the primary processing (a performance prediction value of each of the combustors, the number of cans according to a target load, and the like) and a target load as inputs and outputs of the number of ignition cans in which discharge of an unburned fuel and occurrence of resonance are minimized while the target load is achieved, the arrangement of ignition cans, and the combustion temperature of each of the combustors 3.

For example, the calculation unit 112 outputs prediction information such as 8 cans, arrangement: combustors 3-5 to 3-12, and a combustion temperature x ° C. for a target load of 30%.

(5) Feedback

Also, with regard to prediction of the number of ignition cans, the arrangement of ignition cans, and a combustion temperature for a target load, the calculation unit 112 has a function of receiving feedback of monitoring data which is actually measured (or calculated on the basis of measured values) when the combustors 3 operate under those conditions and predicting the appropriate number of ignition cans, the arrangement of ignition cans, and a combustion temperature capable of achieving a target again when the feedback is different from the prediction or updating the learned models a to d. For example, with regard to the output result such as the number of ignition cans of 8 cans, the arrangement of ignition cans: combustors 3-5 to 3-12, and a combustion temperature x ° C., the calculation unit 112 obtains monitoring data such as actual load, degree of opening of the fuel control valve 6 in each of the combustors 3-5 to 3-12, fuel flow rate, combustion temperature, air flow rate, amount of unburned fuel to be discharged, and vibration information of the turbine 4 via the communication unit 111. These monitoring data are data measured by various sensors or calculated on the basis of the measured values. The monitoring data is received by the communication unit 111 and stored in the storage unit 113.

(5-1) Re-Prediction

For example, when an amount of unburned fuel to be discharged downstream of the combustor 3-5 included in the monitoring data is higher than a predetermined threshold value, the calculation unit 112 predicts a combination of the combustors 3 in which a target load is achieved and the combustor 3-5 is not included using the learned model d. Alternatively, the calculation unit 112 may select another combustor 3 which is expected to have the same performance (an amount of unburned fuel to be discharged) in place of the combustor 3-5 using the learned model b and output the prediction of the number of ignition cans, the arrangement of ignition cans, and a combustion temperature in which the combustor 3-5 is replaced with the other combustor 3 among combinations of the combustors 3 which have been previously predicted. Alternatively, as will be described below, the learned model b associated with the amount of unburned fuel to be discharged of each of the combustors 3 is updated and the number of ignition cans, the arrangement of ignition cans, and a combustion temperature capable of achieving a target load may be predicted again using the latest various models updated so that a performance of each of the combustors 3 can be more accurately predicted.

Also, when the vibration of the turbine 4 matches a natural frequency of blades or when a response level is high, a combination of the combustors 3 is predicted again.

(5-2) Updating of Model

The calculation unit 112 updates the learned models (for example, the learned models b and c described above) in which the performances associated with the combustors 3 are predicted using the newly obtained monitoring data. Furthermore, the calculation unit 112 updates the learned model d associated with the combination of the combustors 3 using the monitoring data. When learning is performed again at a predetermined timing using monitoring data and various models are tuned, it is possible to increase the accuracy of the learned models a to d and improve the prediction accuracy of the number of ignition cans or the like. In addition, it is possible to perform the prediction in consideration of the characteristics of an environment in which the gas turbine operates, changes thereof, and change over time of the combustors 3 by accumulating and learning the latest monitoring data. Also with regard to the physical models A and B, various coefficients may be corrected using the monitoring data fed back.

Although the prediction unit 11 selects the combustor 3 to ignite in accordance with the target load in this way, the determination unit 13 verifies whether this selection is appropriate and confirms that safety standards are satisfied. A process in which determinations concerning the number of ignition cans, the arrangement of ignition cans, and the combustion temperature predicted by the prediction unit 11 are performed and an appropriate combination of the combustors 3 to ignite and the combustion temperature are decided will be described below.

Figure 4:
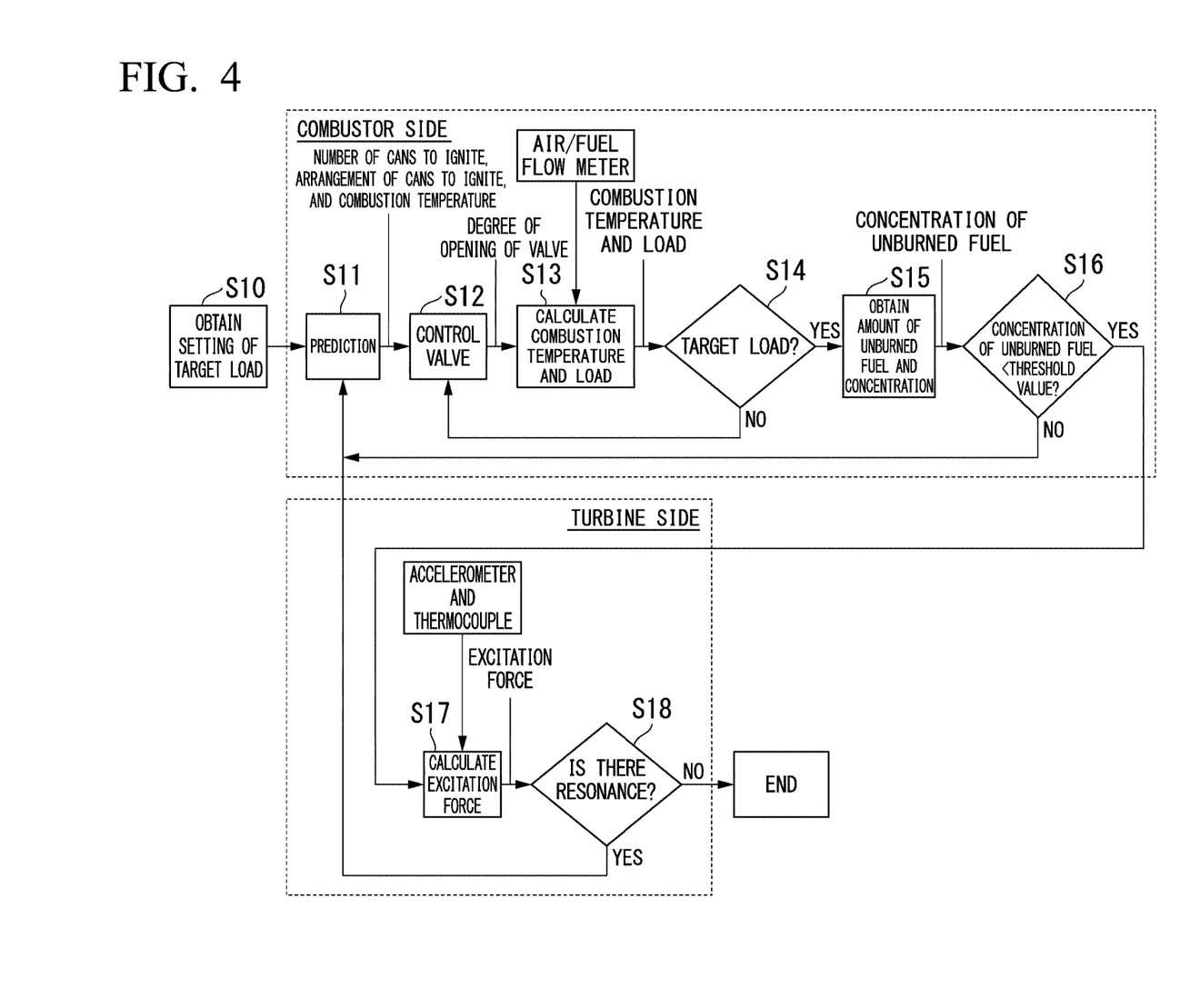
FIG. 4 is a process flowchart showing ignition control of the combustor in the first embodiment of the present invention.

FIG. 4 is a process flowchart showing ignition control of the combustor in the first embodiment of the present invention.

First, the prediction unit 11 (the communication unit 111) obtains setting of a target load (Step S10). The prediction unit 11 (the calculation unit 112) predicts the number of ignition cans, the arrangement of ignition cans, and a combustion temperature according to the target load (Step S11) and outputs the number of ignition cans, the arrangement of ignition cans, and the combustion temperature to the control unit 12.

The control unit 12 calculates a degree of opening of a valve corresponding to the combustion temperature for each of the combustors 3 and controls a degree of opening of the fuel control valve 6 (Step S12). Furthermore, the control unit 12 calculates a degree of opening of the IGV 1 and controls the degree of opening of the IGV 1. Subsequently, the determination unit 13 obtains the degree of opening of a valve calculated by the control unit 12 and a fuel flow rate and an air flow rate measured by various flow meters provided on an upstream side of the combustors 3 and calculates a prediction value of a combustion temperature and a prediction value of a load for each of the combustors 3 (Step S13). The determination unit 13 compares the prediction value of the load with a target load and determines whether the target load has been achieved (Step S14).

When it is determined that the target load has not been achieved (Step S14; No), the control unit 12 calculates the degree of opening of the valve again. The control unit 12 repeatedly performs the adjustment of the degree of opening of the valve until the target load has been achieved. For example, when the target load has not been achieved, the degree of opening of the fuel control valve 6 increases so that the load increases and the fuel flow rate increases.

Also, the determination unit 13 notifies the prediction unit 11 of the calculated prediction value of the combustion temperature and the calculated prediction value of the load. These prediction values are accumulated in the storage unit 113 and used at the time of updating various models or performing prediction again.

If it is determined that the target load has been achieved (Step S14; Yes), subsequently, the determination unit 13 obtains a measured value of an amount of unburned fuel to be discharged (a concentration) measured by a concentration meter provided downstream of the combustors 3 (Step S15). The determination unit 13 determines whether the concentration of the unburned fuel is less than a predetermined threshold value (for example, less than 10 ppm) (Step S16). If it is determined that the concentration of the unburned fuel is equal to or higher than a threshold value (Step S16; No), the prediction unit 11 predicts the number of ignition cans, the arrangement of ignition cans, and the combustion temperature according to the target load again (Step S11). The prediction unit 11 repeatedly performs the prediction of the number of ignition cans, the arrangement of ignition cans, and the combustion temperature until the target load and a threshold value of an unburned fuel concentration have been achieved.

When it is difficult to achieve the conditions of an amount of unburned fuel to be discharged (for example, a threshold value of an unburned fuel concentration), the prediction unit 11 (the calculation unit 112) may perform adjustment such as increasing of a target combustion temperature or decreasing of a target load. The prediction unit 11 predicts the number of ignition cans, the arrangement of ignition cans, and the combustion temperature in which an output as close to the target load as possible can be ensured within a range in which the conditions of the amount of unburned fuel to be discharged can be achieved.

If it is determined that the target load and the conditions of the amount of unburned fuel to be discharged have been achieved (Step S16; Yes), the determination unit 13 calculates an excitation force from measurement results of an accelerometer, a thermocouple, and the like provided in the turbine 4 (Step S17). The determination unit 13 analyzes a vibration mode of the turbine 4 from the excitation force and determines whether resonance occurs (Step S18). For example, the determination unit 13 determines that the resonance occurs if the vibration of the turbine 4 based on the excitation force matches the natural frequency of the blades of the turbine 4 and an amplitude thereof is equal to or greater than a threshold value. When it is determined that the resonance occurs (Step S18; Yes), the prediction unit 11 determines the number of ignition cans, the arrangement of ignition cans, and the combustion temperature again. The prediction unit 11 repeatedly performs determination concerning the number of ignition cans, the arrangement of ignition cans, and the combustion temperature until the target load, the conditions of the amount of unburned fuel to be discharged, and the state in which resonance does not occur have been achieved.

As in the case of the amount of unburned fuel to be discharged, when it is difficult to select a combustor 3 in which resonance does not occur, the prediction unit 11 (the calculation unit 112) may perform adjustment such as increasing of a target combustion temperature or decreasing of a target load. The prediction unit 11 predicts the number of ignition cans, the arrangement of ignition cans, and the combustion temperature in which an output as close to the target load as possible can be ensured within a range in which the conditions of the amount of unburned fuel to be discharged can be achieved and the resonance does not occur.

The prediction unit 11 ends the prediction if a target load, a low amount of unburned fuel to be discharged, and a state in which resonance does not occur can be realized with the predicted number of ignition cans, arrangement of ignition cans, and combustion temperature. Thus, an appropriate combination of the combinations 3 to ignite and a combustion temperature are decided. The control device 10 ignites only a combustor 3 based on the prediction, performs control so that a combustion temperature of the combustor 3 which has ignited is a combustion temperature predicted by the prediction unit 11, and causes the gas turbine to operate in a state in which the remaining combustors 3 are extinguished.

If a target load commanded from a higher-ordered device is changed while the gas turbine is operating, the control device 10 determines a combination of ignition and an extinguishing of the combustors 3 according to a new target load by performing the above-described processing.

According to this embodiment, a required number of combustors 3 ignite in accordance with the magnitude of a target load instead of coping with the fluctuations of the target load by increasing or decreasing a combustion temperature of each can using all of the cans of the combustors 3-1 to 3-16 as targets and are combusted at a combustion temperature at which an amount of unburned fuel to be discharged is equal to or lower than a threshold value. On the other hand, the other combustors 3 fully extinguish and do not have supply of a fuel. That is to say, a combination of combustors 3 in which combustion is performed at a temperature close to a rated combustion temperature and an extinguished combustor 3 copes with the fluctuations of a load. Thus, an unburned fuel can be kept low in the ignited combustor 3 and discharging of an unburned fuel can be prevented in the extinguished combustor 3.

Also, since a combination of the combustors 3 is determined while monitoring is being performed so that resonance with the turbine blade does not occur, it is possible to safely achieve the target load.

Furthermore, according to this embodiment, since the prediction of the arrangement of ignition cans using the prediction unit 11 allows the combustors 3 to ignite or extinguish to be arranged asymmetrically, the effects of minimizing combustion vibration coupled with multiple cans can be expected.

In addition, since the combustor ignition control in this embodiment can be realized through software having the above-described function installed therein, there is no need to develop a new combustor and it is possible to also apply the combustor ignition control to existing gas turbines at low cost.

The determination unit 13 transmits information concerning the degree of opening of the valve, the combustion temperature, the prediction value of the load, the measured value of the unburned fuel concentration, the presence or absence of resonance, and the like used at the time of determination to the prediction unit 11. The prediction unit 11 receives such information and uses the information for tuning of various models.

Second Embodiment

Combustor ignition control in a second embodiment will be described below with reference to FIGS. 5 and 6.

If an operation in which only some of combustors 3 ignite continues due to the ignition arrangement using a prediction unit 11, thermal stress on the combustors 3 and some blades of a turbine 4 increases, which is likely to easily occur damage. In the second embodiment, a bias is not caused in combustors 3 to ignite.

Figure 5:
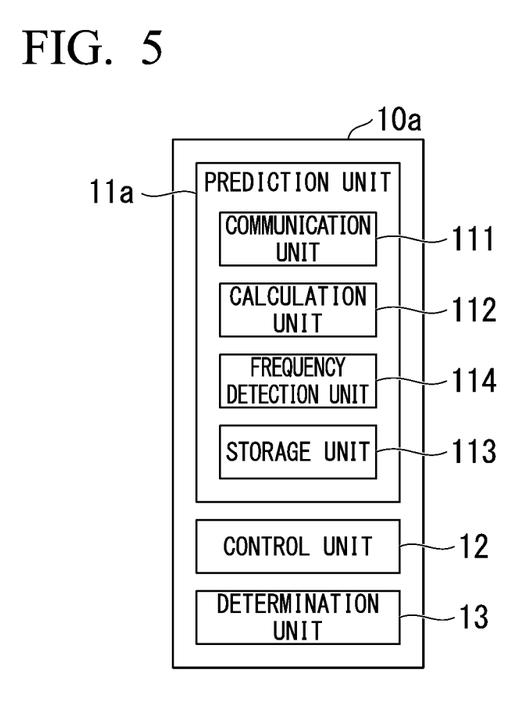
FIG. 5 is a block diagram showing an example of a control device according to a second embodiment of the present invention.

FIG. 5 is a block diagram showing an example of a control device according to the second embodiment of the present invention.

As shown in FIG. 5, a control device 10a includes a prediction unit 11a, a control unit 12, and a determination unit 13. The prediction unit 11a includes a communication unit 111, a calculation unit 112, a storage unit 113, and a frequency detection unit 114.

The communication unit 111 transmits and receives monitoring data and control information.

The calculation unit 112 calculates the number of ignition cans, the arrangement of ignition cans, and a combustion temperature according to a target load.

The frequency detection unit 114 counts an ignition frequency for each of the combustors 3 and determines whether there is no bias in ignition of some of the combustors 3.

The storage unit 113 stores an ignition frequency for each of the combustors 3 in addition to prediction results of the number of ignition cans, the arrangement of ignition cans, and a combustion temperature predicted for each monitoring data and target load.

The control unit 12 and the determination unit 13 are the same as in the first embodiment. A process of selecting a combustor 3 to ignite so that an ignition frequency is not biased will be described below with reference to FIG. 6.

Figure 6:
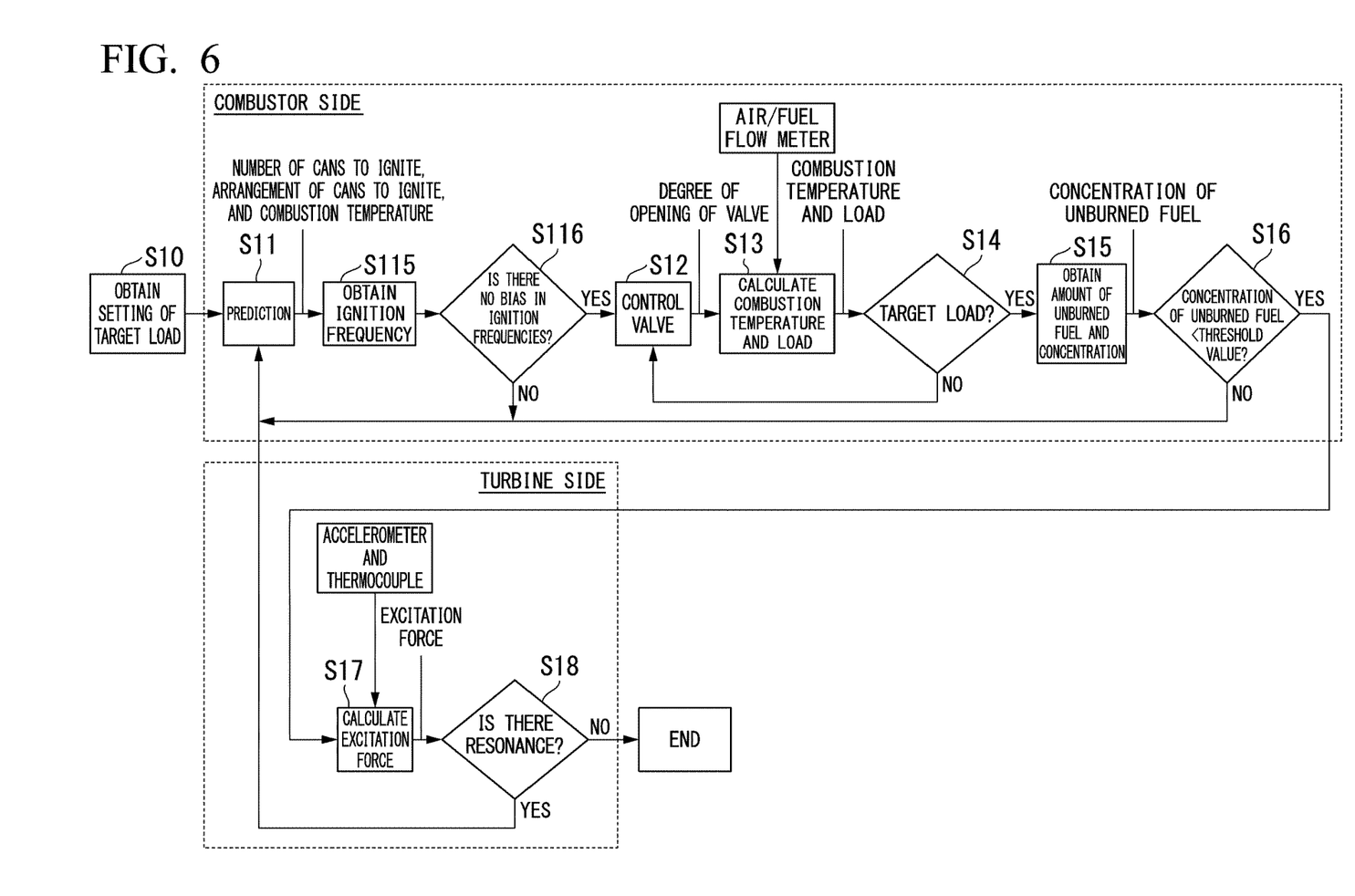
FIG. 6 is a process flowchart showing ignition control of a combustor in the second embodiment of the present invention.

FIG. 6 is a process flowchart showing ignition control of the combustor in the second embodiment of the present invention.

The same processing as in the first embodiment will be briefly described.

First, the communication unit 111 obtains setting of a target load (Step S10). The calculation unit 112 predicts the number of ignition cans, the arrangement of ignition cans, and a combustion temperature according to a target load (Step S11) and outputs the number of ignition cans, the arrangement of ignition cans, and the combustion temperature to the frequency detection unit 114.

The frequency detection unit 114 reads out and obtains an ignition frequency for each of the combustors 3 included in the arrangement from the storage unit 113 on the basis of prediction information concerning the arrangement of ignition cans (Step S115). The frequency detection unit 114 determines whether there is no bias in ignition frequencies of the selected combustors 3 (Step S116). When it is determined that there is a bias in the ignition frequencies between the selected combustors 3 (Step S116; No), the frequency detection unit 114 designates information concerning a combustor 3 having a high ignition frequency and instructs the prediction unit 11 to perform re-prediction. Here, the ignition frequency is, for example, a cumulative value of the number of times of ignition so far. Alternatively, the ignition frequency may be the number of times of ignition in a predetermined period. The prediction unit 11 which has received a re-prediction instruction may, for example, replace a combustor 3 having the highest ignition frequency with a combustor 3 having the lowest ignition frequency and output a combination of the combustors 3 after the replacement and a combustion temperature as prediction information.

For example, when combustors 3 which has ignited equal to or more than a predetermined value compared with an average ignition frequency of 16 cans are included, the determination concerning whether the ignition frequency is high may be determined that an ignition frequency of these combustors 3 is high. Alternatively, when ignition frequencies are compared between the combustors 3 selected through the prediction and a difference is equal to or higher than a predetermined value is included, a combustor 3 having a high ignition frequency may be determined as having a high ignition frequency.

When it is determined that there is no bias in the ignition frequencies (Step S116; Yes), the frequency detection unit 114 adds "1" to an ignition frequency of a combustor 3 which is an ignition target predicted by the calculation unit 112 and writes the ignition frequency after the addition to the storage unit 113. Moreover, the frequency detection unit 114 outputs the number of ignition cans, the arrangement of ignition cans, and a combustion temperature predicted by the calculation unit 112 to the control unit 12.

The control unit 12 controls a degree of opening of a fuel control valve 6 corresponding to each of the combustors 3 on the basis of the combustion temperature (Step S12). Subsequently, the determination unit 13 calculates a combustion temperature for each of the combustors 3 and a prediction value of a load (Step S13). The determination unit 13 determines whether the prediction value of the load has reached a target load (Step S14). When it is determined that the target load has not been achieved (Step S14; No), the control unit 12 repeatedly performs adjustment for a degree of opening of a valve until the target load has been achieved.

If it is determined that the target load has been achieved (Step S14; Yes), the determination unit 13 obtains an amount of unburned fuel to be discharged (a concentration) from a concentration meter (Step S15) and determines whether the amount of unburned fuel to be discharged is less than a threshold value (Step S16). When it is determined that the an amount of unburned fuel to be discharged is equal to or greater than a threshold value (Step S16; No), the prediction unit 11 repeatedly performs the determination of the number of ignition cans, the arrangement of ignition cans, and the combustion temperature until the target load and the conditions of the amount of unburned fuel to be discharged have been achieved.

If it is determined that the target load and the conditions of the amount of unburned fuel to be discharged have been achieved (Step S16; Yes), the determination unit 13 calculates an excitation force (Step S17) and determines whether resonance occurs in the turbine 4 (Step S18). When it is determined that resonance occurs (Step S18; Yes), the prediction unit 11 repeatedly performs the determination of the number of ignition cans, the arrangement of ignition cans, and the combustion temperature until the target load, the conditions of the amount of unburned fuel to be discharged, and a state in which resonance does not occur have been achieved.

According to this embodiment, it is possible to level thermal stress for each of the combustors 3 in addition to the effects of the first embodiment. Thus, this prevents the combustor 3 from being damaged or deteriorated due to the bias of the ignition to some of the combustor 3, thereby extending the lifespan.

Although the bias of the ignition frequency is checked with respect to the number of ignition cans, the arrangement of ignition cans, and the combustion temperature predicted by the calculation unit 112 in the above processing example, the calculation unit 112 may include a function of the frequency detection unit 114 and the number of ignition cans, the arrangement of ignition cans, and the combustion temperature may be predicted using a learned model or an algorithm in which the calculation unit 112 performs prediction in which a bias does not occur in the number of ignitions. For example, when 8 cans (3-5 to 3-12) ignite in the example of FIG. 2, if the same target load is applied next, an algorithm in which a combination of the combustors 3-6 to 3-13 or the combustors 3-4 to 3-11 obtained by shifting one by one is selected may be used and an algorithm in which the combustors 3-1 to 3-4 and the combustor 3-13 to 3-16 which have extinguished this time am selected may be used.

Alternatively, a combustor 3 having the highest ignition frequency regardless of a target load may be excluded from selection targets and the prediction unit 11 may predict the number of ignition cans, the arrangement of ignition cans, and the combustion temperature.

Even when a combination of the combustors 3 is determined so that a bias does not occur in an ignition frequency, it is desirable to count an ignition frequency to investigate a relationship between a lifespan of the combustor 3 and the ignition frequency.

Figure 7:
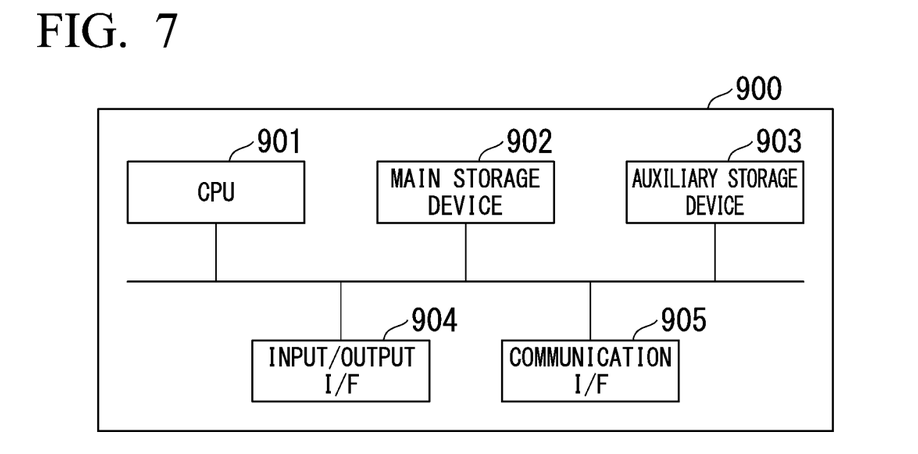
FIG. 7 is a diagram showing an example of a hardware constitution of a control device according to each embodiment of the present invention.

FIG. 7 is a diagram showing an example of a hardware constitution of a control device according to each embodiment of the present invention.

A computer 900 is, for example, a personal computer (PC) or a server terminal device which includes a CPU 901, a main storage device 902, a main storage device 902, an auxiliary storage device 903, an input/output interface 904, and a communication interface 905. The above-described control devices 10 and 10a are installed in the computer 900. Furthermore, an operation of each processing unit described above is stored in the auxiliary storage device 903 in the form of a program. The CPU 901 reads out a program from the auxiliary storage device 903, develops the program in the main storage device 902, and executes the above processing in accordance with the program. Furthermore, the CPU 901 secures a storage region corresponding to the storage unit 113 in the main storage device 902 in accordance with the program. In addition, the CPU 901 secures a storage region having data being processed stored therein in the auxiliary storage device 903 in accordance with the program.

In at least one embodiment, the auxiliary storage device 903 is an example of a non-transitory tangible medium. Other examples of the non-transitory tangible medium include a magnetic disk, a magneto-optical disk, a compact disk (CD)-read only storage (ROM), a digital versatile disc (DVD)-ROM, a semiconductor storage, and the like connected via the input/output interface 904. Furthermore, when the program is distributed to the computer 900 through a communication line, the computer 900 which received the distributed program may develop the program in the main storage device 902 and execute the above processing. In addition, the program may be for realizing some of the above functions. Moreover, the program may be a so-called difference file (difference program) in which the above functions are realized through a combination of the file (the program) with another program stored in the auxiliary storage device 903 in advance.

In addition, it is possible to appropriately replace the constituent elements in the above-described embodiment with known constituent elements without departing from the gist of the present invention. Furthermore, the technical scope of the present invention is not limited to the above embodiment and various changes can be provided without departing from the gist of the present invention.

The prediction unit 11 is an example of a predictor.

EXPLANATION OF REFERENCES

1 IGV
2 Compressor
3 Combustor
4 Turbine
5 Rotor
6 Fuel control valve
7 Fuel pipe
8 Electric power generator
10, 10a Control device
11, 11a Prediction unit
12 Control unit
13 Determination unit
111 Communication unit
112 Calculation unit
113 Storage unit
114 Frequency detection unit
900 Computer
901 CPU
902 Main storage device
903 Auxiliary storage device
904 Input/output interface
905 Communication interface

What is claimed is:

1. A method of controlling a gas turbine including a plurality of combustors, comprising:
    determining a number and an arrangement of one or more combustors of the plurality of combustors to ignite for achieving a target load on the basis of a learned model in which a relationship between the target load and the number of the one or more combustors, the arrangement of the one or more combustors, and a combustion temperature of the one or more combustors is defined; and
    selecting and igniting the one or more combustors based on the learned model, wherein the learned model has learned the combustion temperature at which an amount of unburned fuel to be discharged falls within an allowable range.

2. A non-transitory tangible computer readable medium of a computer, the non-transitory tangible computer readable medium storing instructions for controlling a gas turbine, the gas turbine having a plurality of combustors, wherein the instructions when executed by a processor of the computer cause the computer to:
    determine a number and an arrangement of one or more combustors of the plurality of combustors required to ignite for achieving a target load on the basis of a learned model in which a relationship between the target load and the number of the one or more combustors, the arrangement of the one or more combustors, and a combustion temperature of the one or more combustors is defined; and
    select and ignite the one or more combustors based on the learned model, wherein the learned model has learned the combustion temperature at which an amount of unburned fuel to be discharged falls within an allowable range.

3. A device for controlling a gas turbine including a plurality of combustors, the device comprising:
    a processor; and
    a memory coupled to the processor, the memory having stored thereon instructions which, when executed by the processor,
    cause the device to:
        determine a number, a combustion temperature, and an arrangement of one or more combustors of the plurality of combustors to ignite to achieve a target load on the basis of a learned model in which a relationship between the target load and the number of the one or more combustors, the arrangement of the one or more combustors, and the combustion temperature of the one or more combustors is defined; and
        select and ignite the one or more combustors, wherein device is configured to control the combustion temperature of the one or more combustors.

4. The device according to claim 3, wherein the memory has stored thereon instructions which, when executed by the processor, cause the device to:
    perform control so that combustors other than the one or more combustors are fully extinguished.

5. The device according to claim 3, wherein the memory has stored thereon instructions which, when executed by the processor, cause the device to:
    determine whether an amount of unburned fuel to be discharged is equal to or less than a predetermined value for each of the one or more combustors.

6. The device according to claim 5, wherein the memory has stored thereon instructions which, when executed by the processor, cause the device to:
    determine a presence or an absence of resonance of a turbine for each of the one or more combustors.

7. The device according to claim 3, wherein the memory has stored thereon instructions which, when executed by the processor, cause the device to:
    minimize an amount of unburned fuel to be discharged to be equal to or less than a predetermined threshold value while the target load is achieved and determine a combination of the one or more combustors in which resonance of the turbine does not occur.

8. The device according to claim 3, wherein the memory has stored thereon instructions which, when executed by the processor, cause the device to:
    detect an ignition frequency for each of the one or more combustors, and
    select the one or more combustors so that the bias of the ignition frequency detected by the frequency detection unit falls within a predetermined range.

9. The device according to claim 3, wherein the memory has stored thereon instructions which, when executed by the processor, cause the device to:
    when the target load is achieved, determine a combination of combustors for selecting and igniting by shifting the one or more combustors by one.

10. The device according to claim 3, wherein the learned model is composed of a plurality of learned models and the plurality of learned models includes a first learned model in which a performance for each of the one or more combustors is predicted and a second learned model in which the number of the one or more combustors, the arrangement of the one or more combustors, and the combustion temperature of each of the one or more combustors is predicted.

11. A gas turbine, comprising:
a compressor;
a plurality of combustors;
a turbine; and
the device according to claim 3.

* * * * *